US011964790B2

(12) United States Patent
Sandrock et al.

(10) Patent No.: US 11,964,790 B2
(45) Date of Patent: Apr. 23, 2024

(54) DEVICE FOR EMPTYING A FLEXIBLE BAG

(71) Applicant: SARTORIUS STEDIM FMT SAS, Aubagne (FR)

(72) Inventors: Rainer Sandrock, Kassel (DE); Marc Hogreve, Adelebsen (DE)

(73) Assignee: SARTORIUS STEDIM FMT SAS, Aubagne (FR)

( * ) Notice: Subject to any disclaimer, the term of this patent is extended or adjusted under 35 U.S.C. 154(b) by 310 days.

(21) Appl. No.: 17/291,459

(22) PCT Filed: Nov. 13, 2019

(86) PCT No.: PCT/EP2019/081234
§ 371 (c)(1),
(2) Date: May 5, 2021

(87) PCT Pub. No.: WO2020/099515
PCT Pub. Date: May 22, 2020

(65) Prior Publication Data
US 2022/0024625 A1     Jan. 27, 2022

(30) Foreign Application Priority Data

Nov. 14, 2018  (EP) .................................... 18206242

(51) Int. Cl.
*B65D 35/28* (2006.01)
*B65B 69/00* (2006.01)
*G01M 3/00* (2006.01)

(52) U.S. Cl.
CPC ............. *B65B 69/005* (2013.01); *G01M 3/00* (2013.01)

(58) Field of Classification Search
CPC ........... B65D 35/28; A61J 1/10; B67D 7/0216
(Continued)

(56) References Cited

U.S. PATENT DOCUMENTS 1,879,208 A * 9/1932 Gusdorf ................. B65D 35/28
                                                           222/103
5,322,194 A * 6/1994 Roberts .................. B65D 35/28
                                                           222/105

(Continued)

FOREIGN PATENT DOCUMENTS

DE     4218297 A1    10/1993
EP     3061693 A1    8/2016
(Continued)

OTHER PUBLICATIONS

International Preliminary Report on Patentability for International Application No. PCT/EP2019/081234 issued on May 18, 2021.
(Continued)

*Primary Examiner* — Donnell A Long
*Assistant Examiner* — Randall A Gruby
(74) *Attorney, Agent, or Firm* — Heslin Rothenberg Farley & Mesiti P.C.; Victor A. Cardona, Esq.

(57) ABSTRACT

A device for emptying a flexible bag comprising a fluid product, comprising a tray including a base having at least a top flat surface and two side members rigidly mounted on the base, perpendicularly to the base, the base being arranged substantially horizontally, namely along a front-rear direction and a left-right direction, a pressure element having at least a flat bottom face, for pressing downwards on a flexible bag under the influence of gravity. The tray includes guiding means for guiding the pressure element, as it goes downwards when the bag is emptying. The pressure element exhibits a gravity center and a geometric center, the gravity center being away from the geometric center.

21 Claims, 4 Drawing Sheets

(58) Field of Classification Search
USPC .................. 604/403, 408, 262; 222/95, 103
See application file for complete search history.

(56) References Cited

U.S. PATENT DOCUMENTS

| | | | |
|---|---|---|---|
| 5,897,030 A * | 4/1999 | Stangle | B65D 35/28 |
| | | | 222/557 |
| 6,273,297 B1 | 8/2001 | Schalow et al. | |
| 9,266,657 B2 * | 2/2016 | Baud | B65B 3/003 |
| 2007/0045339 A1 * | 3/2007 | Manion | B67D 1/0001 |
| | | | 222/386.5 |
| 2018/0125754 A1 | 5/2018 | Sanchez et al. | |
| 2022/0024625 A1 * | 1/2022 | Sandrock | B65B 69/0008 |

FOREIGN PATENT DOCUMENTS

| | | | |
|---|---|---|---|
| KR | 20160048416 A * | 5/2016 | |
| WO | 2004063039 A1 | 7/2004 | |

OTHER PUBLICATIONS

Office Action from parallel EP Application No. 18206242.2-1014 dated Feb. 2, 2023, 4 pp.
International Search Report and Written Opinion of the International Searching Authority for International Application No. PCT/EP2019/081234 mailed on Dec. 6, 2019.

\* cited by examiner

US 11,964,790 B2

DEVICE FOR EMPTYING A FLEXIBLE BAG

CROSS REFERENCE TO RELATED APPLICATIONS

This application is a national stage filing under section 371 of International Application No. PCT/EP2019/081234, filed on Nov. 13, 2019, published on May 22, 2020 as WO 2020/099515 A1 which claims priority to European Patent Application No. 18206242.2, filed on Nov. 14, 2018. The entire disclosure of each application is hereby incorporated herein by reference.

FIELD OF THE INVENTION

This invention relates to a device for emptying a flexible bag. The flexible bags at stake here are plastic bags designed to contain a biopharmaceutical product. Such plastic bags are mostly single-use bags.

BACKGROUND OF THE DISCLOSURE

Such plastic bags need to be tested after manufacturing, notably concerning the integrity and the absence of leak. It is common to use a gas pressure test to check the integrity of a new bag. Even though an inert gas like helium or nitrogen is used for the test, after the test, the flexible bag needs to be completely emptied before the bag is used for accommodating the target biopharmaceutical product.

An example of prior art is Pall EP3061693. However, one drawback of that proposal is that one or more air pocket can be trapped at the bottom of the bag.

Now, the inventors have endeavored to find a new solution for reliably emptying a flexible bag intended to accommodate a biopharmaceutical product.

SUMMARY OF THE DISCLOSURE

According to one aspect of the present invention, it is disclosed a device for emptying a flexible bag comprising a fluid product, the device comprising:
- a tray comprising a base having at least a top flat surface and two side members rigidly mounted on the base, perpendicularly to the base, the base being arranged substantially horizontally, namely along a front-rear direction (X) and a left-right direction (Y),
- a pressure element having at least a flat bottom face, for pressing downwards on a flexible bag under the influence of gravity,
- wherein the tray comprises guiding means for guiding the pressure element, as it goes downwards when the bag is emptying,
- characterized in that the pressure element exhibits a gravity center (GRAC) and a geometric center (GEOC), and the gravity center is away from the geometric center.

Since the flexible bag to be filled and emptied has port(s) at the front portion, and thanks to dispositions set out above, the gravity center is located at a rear position with respect to the geometric center, and therefore the pressure element applies pressure mostly firstly on the back portion of the bag, and then gradually, as soon as the back border touches down, the pressure element then pivots about its back border and reaches finally a substantial horizontal position, thereby chasing out all the fluid or gas previously contained in the bag.

The fluid in question can be typically a gas without excluding liquid. The gas is preferably an inert gas to prevent any chemical interaction with the bag material or the target biopharmaceutical product intended to be housed in the bag.

The geometric center is defined by first projecting the pressure plate on a plane comprising the length and width, and along the thickness (third) direction, obtaining therefrom a projected shape, and then calculating the barycenter of the projected shape which gives the geometric center.

We note that for a flat homogeneous plate the geometric center and the gravity center have the same position. Advantageously according to the present disclosure, it is intended by contrast to place the gravity center away from the geometric center.

By convention, we define the front area/direction according to the position of the ports on the bag(s), and under this assumption, the gravity center is offset in the backwards direction.

In various embodiments of the proposed device, one may possibly have recourse in addition to one and/or other of the following arrangements, taken alone or in combination.

According to one option, the pressure element can be monolithic with a thickness gradient, with or without steps. In other words, along a front-rear longitudinal cross section, the section can be somewhat increasing or even triangular, or there can be provided steps in the longitudinal profile. Whereby we provide a reliable and aesthetic solution to offset the gravity center.

According to another option, the pressure element can be a flat, constant thickness plate with an offset weight placed atop the plate and backwards with respect to the geometric center. Whereby we provide a cost-effective, economical solution.

According to one option, the pressure element is substantially rectangular with four corners, the geometric center is defined at the intersection of two diagonal lines joining respectively two pairs of opposite corners. Thus there is provided an easy way to spot and locate the geometric center.

According to one option, there is provided a rest position (P0) for the pressure element, wherein the pressure element is at a predetermined distance from the base of the tray, facilitating thereby installation of a flexible bag on the tray. Advantageously a pressure leak test can be carried out while the pressure element is on its rest position and has no contact with the inflated bag, thereby not interfering at all with the bag, and thus enhancing the leak test accuracy.

According to one option, the gravity center and the geometric center are spaced from one another by a predetermined distance (D1) which is at least 5 mm, preferably at least 10 mm. A substantial backward disbalance is thereby provided to ensure that the back portion of the bag is emptied first.

According to one option, there is provided, in a center front portion of the pressure element, a recessed area for accommodating ports and/or tubes of a flexible bag. Since the thickness of the tubes and ports are greater than the thickness of the bag walls, and thanks to the recessed area, the tubes and ports do not prevent the pressure plate to go down completely, parallel to the base of the tray and flush with all the thin bag walls.

According to one option, the pressure element comprises lateral lugs (21-24) protruding in the horizontal direction. Thereby it is provided a simple solution, where such lugs can be received in or cooperate with grooves in the side members.

According to one option, there are provided at least two vertical stoppers in each side members of the tray, for limiting the movement of the pressure element along the front-rear direction. This turns out to be a simple mechanical solution to provide stopper members, for stopping lugs or the like, at the side members.

According to one option, the pressure element comprises wheels or rollers (61-62) with their axis in the horizontal direction. Thereby guidance and easy sliding can be enhanced; risk of pressure element getting jammed are reduced. Wheels can co-operate with vertical stoppers like lugs do.

According to one option, there are provided rest stands in each side members of the tray. This provides a convenient solution for providing a rest position for the pressure element. A convenient free space is therefore provided to easily install a new bag to be emptied on the tray, the distance separating the base of the tray from the pressure element can be substantially the height H1 of the tray side members. As already mentioned, a pressure leak test can be carried out while the pressure element is on its rest position and has no contact with the inflated bag, thereby not interfering at all with the bag, thereby enhancing leak test accuracy.

According to one option, the horizontal overall dimensions of the pressure element (L2,W2) are slightly less than the horizontal overall dimensions of the tray (L1,W1). Various width of bags can be treated and emptied with such configuration. Regarding length, also various lengths of bags can be treated and emptied with such configuration, provided care is taken to place the ports at the front side of the base of the tray.

The present invention is also directed to a system comprising a device as described above, and one or more flexible bags to be emptied.

According to one option, the device can be dedicated to empty a particular type of bag. In alternative embodiment, the device can be used to empty more than one type of bag, of the same size or of different sizes and/or different available volumes.

According to one option, the horizontal overall dimensions of the bags (L3,W3) are slightly less than the horizontal overall dimensions of the tray (L1,W1). In this case, the operator is guided and there is no risk of misplacing the bag.

According to one option, the horizontal overall dimensions of the bags (L3,W3) are substantially the same as the horizontal overall dimensions of the pressure element (L2, W2). Thereby, the emptying operation is straightforward and reliable.

Generally speaking, the promoted device is compact and requires a minimal footprint regarding the size of the bags to be emptied.

The present disclosure also proposes a method carried out with a device for emptying a flexible bag comprising a fluid product, the device comprising a tray comprising a base, and guiding means, the method comprising:

a-providing a pressure element having at least a flat bottom face, for pressing downwards on a flexible bag under the influence of gravity, wherein the pressure element exhibits a gravity center (GRAC) and a geometric center (GEOC), and the gravity center is away from the geometric center, b-providing a rest position (P0) for the pressure element at distance from the tray base, and having the pressure element at the rest position (P0), c-providing a bag to be emptied and placing such bag on the tray, d-moving the pressure element away from the rest position, e-let the pressure element go downwards under the influence of gravity while the bag is emptying, the pressure element being guided by the guiding means of the tray, pressing firstly on the back portion of the bag.

In various embodiments of the proposed method, one may possibly have recourse in addition to one and/or other of the following arrangements, taken alone or in combination.

The method may further comprise between steps c- and d-:

c2-carrying out a pressure leak test on the bag.

The method may further comprise after step e-:

f-lifting the pressure element and placing it back on the rest position (P0) to allow a repetition of steps c-, d-, e-.

BRIEF DESCRIPTION OF THE DRAWINGS

Other features and advantages of the invention appear from the following detailed description of some of its embodiments, given by way of non-limiting example, and with reference to the accompanying drawings, in which.

DETAILED DESCRIPTION OF THE DISCLOSURE

In the figures, the same references denote identical or similar elements, unless stated otherwise. For the sake of clarity, some elements may not be represented at scale.

System Overview

Figure 1:
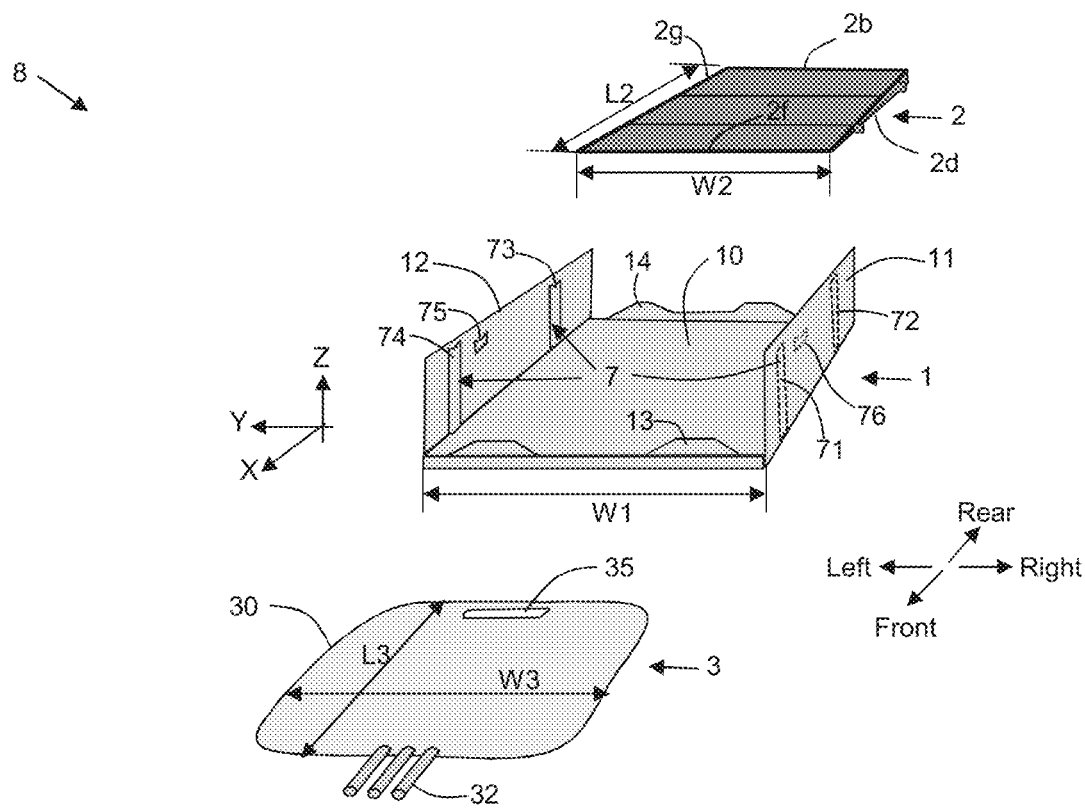
FIG. 1 shows an overall schematic layout of a bag emptying device according to a first embodiment of the present disclosure.

FIG. 1 shows an overall schematic layout of a system suitable for emptying a flexible bag.

In the context of the present disclosure, there are provided bags 3 that are each to pass a leak-free test, carried out by injection of a gas into the bag, under pressure. After this test, the bag 3 is intended to be filled with a biopharmaceutical product.

Here, the biopharmaceutical product is typically a biopharmaceutical fluid, for example a fluid derived from a biopharmaceutical process, like a culture medium, a cell culture, a buffer solution, a blood fraction, or any fluid specifically designed to be used in the medical field.

It should be noted that the gas used for pressure testing is typically an inert gas. In one embodiment, an inert gas like nitrogen is used for pressure testing.

It should also be noted that the emptying method and system disclosed here could be used for liquid instead of gas and therefore the term 'fluid' is used for encompassing both gas and liquid configuration.

Regarding the bags, one can use for example available products like the bag product range Flexboy® from the applicant company Sartorius Stedim Biotech®. Other single use flexible bags can also be used within the context of the present invention. According to one possibility, the bags can be single use bags.

Generally speaking, the bag 3 may have a volume ranging, for example, from 50 ml up to 50 liters of biopharmaceutical fluid. In some embodiments, the bag volume can be in the range from 50 ml to 500 ml, in other the bag volume can be in the range from 500 ml to 3 liter, in other the bag volume can be in the range from 1 liter to 10 liter, in other the bag volume can be in the range from 5 liter to 50 liter.

According to one example, the bag may have an overall flat shape and is known as a "2D" bag. Length L3 can range from 20 cm to 80 cm. Width W3 can range from 10 cm to 60 cm. Thickness is smaller than the two other dimensions.

The bag at stake generally comprises one or more ports 32, to which one or more tubes are coupled. By convention, the front side of the bag is the side where the ports 32 are located. Accordingly, "front" side is consistently used for other items described later on.

The bag at stake generally comprises one handling recess 35. The handling recess can be through hole. The handling recess is located at the back side of the bag, opposite the ports. Fingers of a user can be inserted in such handling recess 35 to lift and manipulate the bag. Instead of 'user' we can also use 'operator' to designate qualified people in charge of carrying out the emptying operation.

Such bags are made of plastic material. Such bags are made by arranging two plastic walls upon one another and by soldering the wall edges together all around a peripheral border 30. Generally the bag wall can be made of polyethylene, polypropylene, polyester or more generally any polymer compound compatible with the biopharmaceutical product to be processed. More specifically, the wall of a single-use pouch is generally composed of a multilayer film comprising a contact layer which is in contact with the medium that fills the pouch, a barrier layer and an outer layer which is in contact with the external environment of the bag, the three layers being connected one to each other with a tie layer. If the pouch is to be filled with a biopharmaceutical product, the contact layer should be made from a material that can be in contact with this biopharmaceutical product without causing degradation of the film and of the biopharmaceutical product. Furthermore, it must be sealable on itself. For that purpose, the material is generally selected from polyolefins, such as polyethylene.

The barrier layer provides a barrier to the passage of gases such as oxygen, carbon dioxide and is typically made from ethylene vinyl alcohol (EVOH).

The outer layer contributes to the mechanical strength of the pouch wall. For that purpose, it must be sufficiently flexible to withstand high mechanical stress but not be too much stretchable in order to prevent deformation of the pouch when it is filled with a product.

Tray

The promoted device comprises a tray 1. Instead of 'tray', one can use the terms of 'frame' or 'support' or 'box'.

The tray 1 comprises a base 10 having at least a top flat surface, for receiving the underside of the bag to be emptied. The bottom side of the tray can rest in a stable manner on a table or any like supportive item.

The tray 1 comprises two side members 11,12 rigidly mounted on the base. The two side members 11,12 are arranged perpendicularly to the base 10.

We note that the terms front and rear/back are used for the tray consistently with same terms for the bags.

There can be provided a rear bulge or a rear stand 14, which can serve as a rear stop when a user installs a bag to be emptied on the tray.

Optionally, at a front portion, there can also be provided one or more front bulges or beads 13 projecting upwardly.

The base 10 is arranged substantially horizontally, namely along a front-rear direction X (longitudinal direction) and a left-right direction Y (transverse direction). The third direction Z is the vertical direction. We note here that, as a 2D structure, the bag can be inserted upside down.

The overall dimensions of the tray are: length L1 along X, width W1 along Y, and height H1 along Z.

The thickness of the base 10 along Z can be comprised between 3 mm and 10 mm.

The tray can be made integrally as one plastic molded part. Alternately, the tray can be made with a base and the two side members assembled together.

Material for manufacturing the tray can be chosen among: stainless steel, polyethylene, polypropylene, PVC, ABS, or like plastic solutions allowed in industrial bio-pharmaceutical processes.

The two side members 11, 12 comprise guiding means 7 that will be detailed below, such guiding means being designed for guiding a so-called pressure element as the latter goes downwards when the bag is emptying.

Pressure Element

The above-mentioned pressure element 2 forms a weight that passively uses gravity in order to empty a bag located beneath the pressure element 2. The pressure element exhibits at least a flat bottom face 20 for pressing downwards on a flexible bag 3 under the influence of gravity.

Instead of 'pressure element', one can possibly use the terms "pressure plate" "pressure member" "weight member".

In certain embodiments, the weight of the pressure element 2 can be comprised between 500 grams and 5 kilograms. The weight of the pressure element can be decided upon a targeted range of surface pressure. Surface pressure can be in the range between $0.01$ $N/cm^2$ and $1$ $N/cm^2$, more preferably in the range between $0.01$ $N/cm^2$ and $0.16$ $N/cm^2$, and more preferably in the range between $0.01$ $N/cm^2$ and $0.02$ $N/cm^2$.

The pressure element exhibits a back border 2b, side borders 2d, 2g, and a front border 2f.

When the pressure element is inside the tray, the side borders are locate opposite the side members of the tray. Distance between side borders 2d, 2g, namely width of the pressure element, is noted W2. Distance between front and back borders 2b, 2f, namely length of the pressure element, is noted L2.

Figure 2:
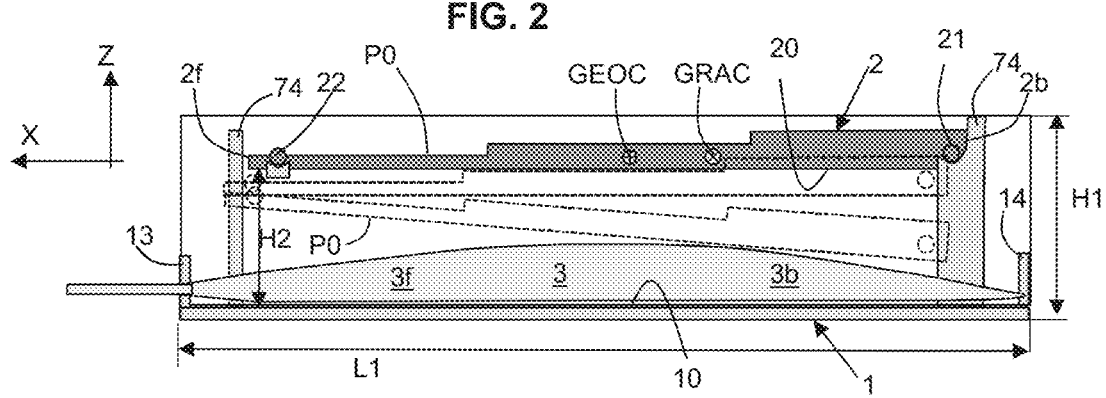
FIG. 2 illustrates a cross-section of a device according to the present disclosure.
Figure 4:
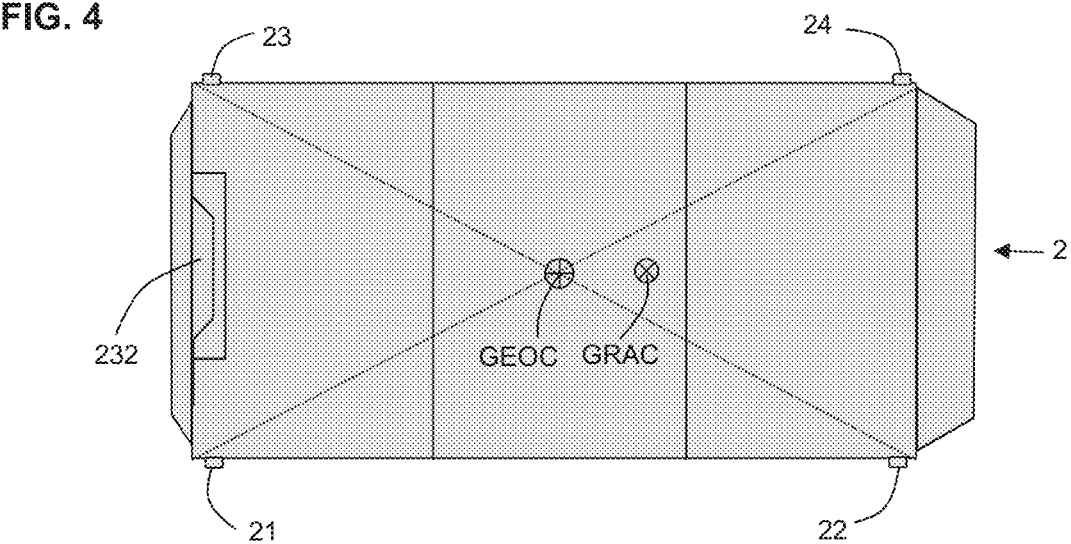
FIG. 4 illustrates top view of the pressure element.
Figure 5:
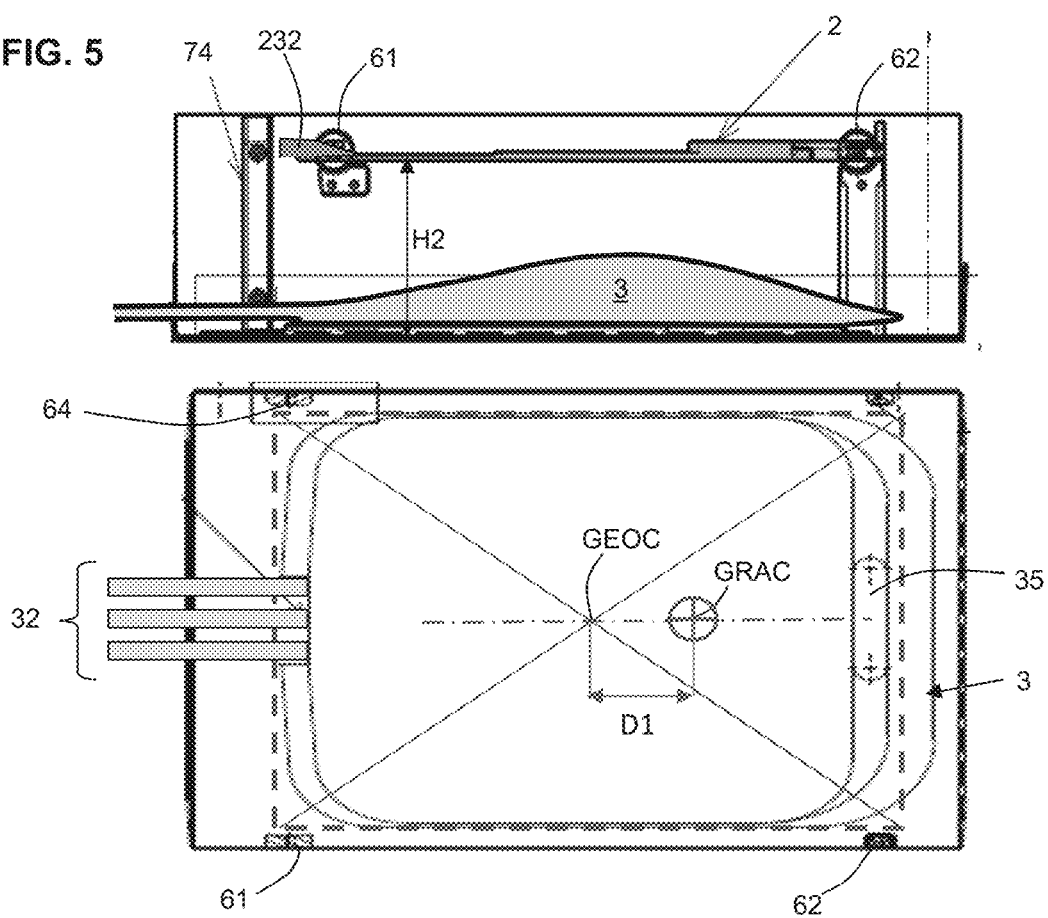
FIG. 5 illustrates a side elevation view and a top view according to a second embodiment.
Figure 6:
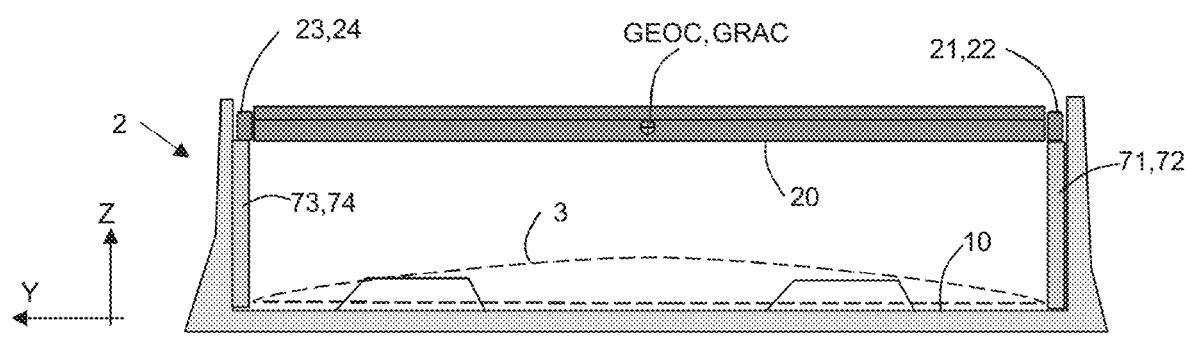
FIG. 6 illustrates a schematic front elevation view according to the second embodiment
Figure 7:
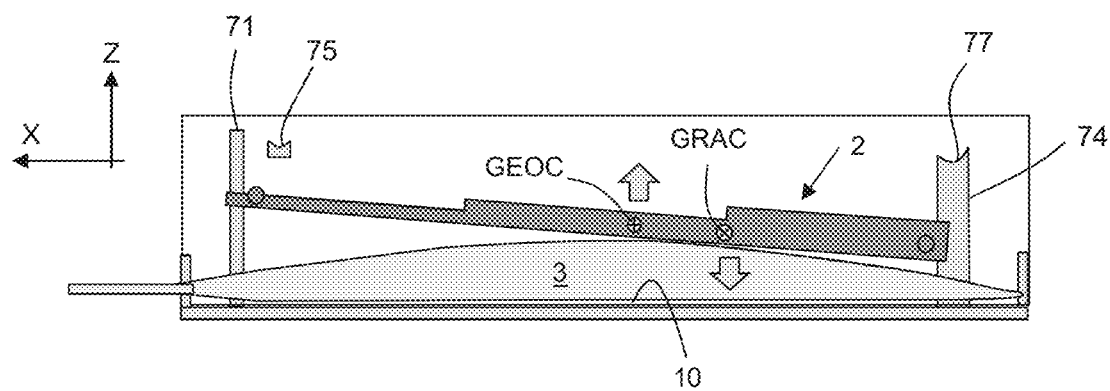
FIG. 7 illustrates a schematic side view according to the second embodiment.

The pressure element exhibits a gravity center noted GRAC and a geometric center noted GEOC, illustrated at FIGS. 2, 4 and 5. The geometric center GEOC is defined by first projecting the pressure plate 2 on a plane XY (comprising the length and width), along the thickness Z direction; we obtain therefrom a projected shape, and then we calculate the barycenter of the projected shape which gives the above-mentioned geometric center GEOC.

In a simple case where the pressure element is substantially rectangular with four corners, the geometric center is defined at the intersection of two diagonal lines joining respectively two pairs of opposite corners. The gravity center GRAC is the barycenter of all the involved weights, irrespective of the (their) shape.

The inventors have designed the pressure element such that the gravity center GRAC is away from the geometric center GEOC. Said otherwise, the pressure element 2 is intentionally disbalanced.

More precisely, if we consider the "front" as being the side where the ports of the bag are situated, the gravity center GRAC is offset backward with regard to the geometric center GEOC.

Preferably, the gravity center and the geometric center can be spaced from one another by a predetermined distance D1 which is at least 5 mm, preferably at least 10 mm, without excluding a greater distance for large volume bag configuration.

Therefore, the pressure element 2 applies pressure mostly firstly on the back portion 3b of the bag, and then gradually, as soon as the back border touches down, the pressure element then pivots about its back border and reaches finally a substantial horizontal position, thereby chasing out all the gas previously contained in the bag, including from the front portion 3f of the bag.

The weight offset can be obtained in various ways. The pressure element may be monolithic with a thickness gradient, with or without steps. The back side is thicker that the front side.

The pressure element can be a flat, constant thickness plate with an additional offset weight placed backwards with respect to the geometric center.

Figure 3A:
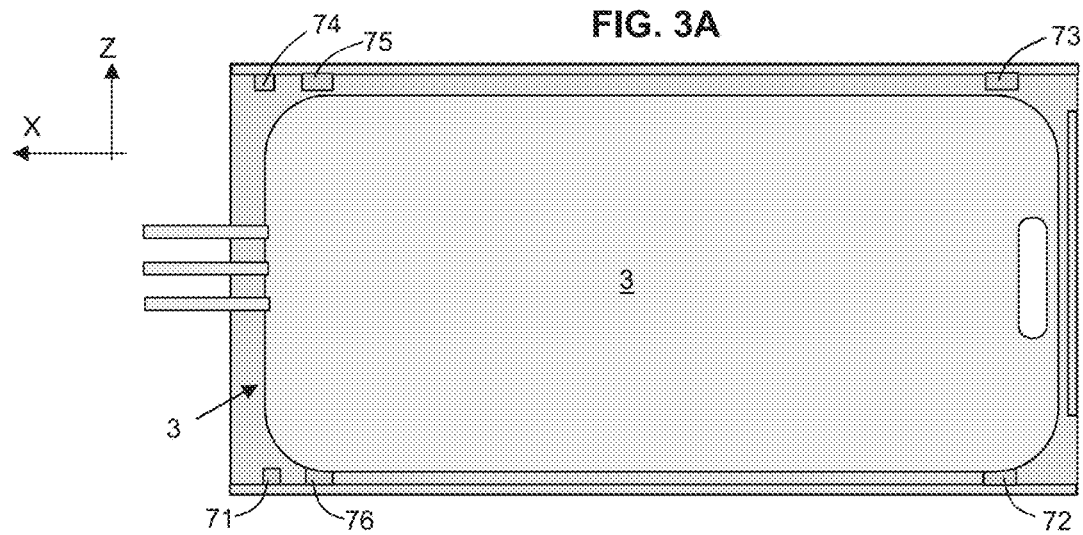
FIG. 3A illustrates a top view of the device with a bag to be emptied, without the pressure element.
Figure 3B:
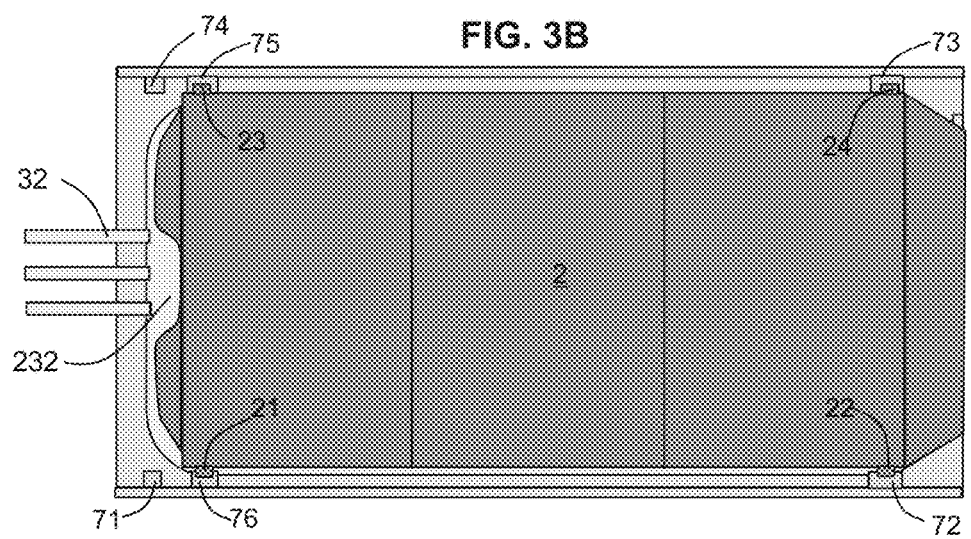
FIG. 3B illustrates a top view of the device with a bag to be emptied, with the pressure element in the rest position.
Figure 3C:
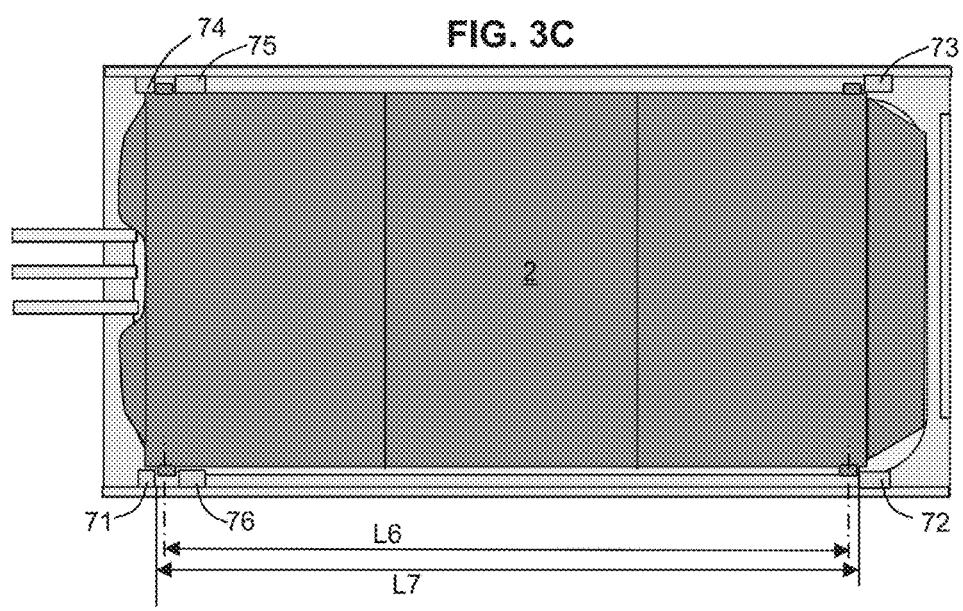
FIG. 3C illustrates a top view of the device with a bag to be emptied, with the pressure element in the pressing position.

There may be provided, in a center front portion of the pressure element 2, a recessed area 232 for accommodating tubes of a flexible bag, as illustrated at FIG. 3B.

The recessed area 232 may be formed in a distinct part fixed of the rest of the plate. This specific part can be replaced to accommodate various types of bag front configuration.

Guiding Means

Guiding means designate any element or entity or shape that is arranged at the side members to guide (limit the freedom of movement) of the pressure element 2. Guiding means and possibly one or more cooperating elements in the pressure element 2 are intended to allow a translation of the pressure element according to the vertical axis Z, a rotation of the pressure element around the transverse axis Y.

By contrast, translation along the transverse axis Y is to be limited by the side member of the tray, translation along the longitudinal axis X is to be limited by the below detailed guiding means and cooperating elements in the pressure element 2.

According to the first embodiment, guiding means in the tray comprise a first vertical stopper 71 arranged close to the front right corner of the tray, a second vertical stopper 72 arranged close to the rear right corner of the tray, a third vertical stopper 73 arranged close to the rear left corner of the tray, and a fourth vertical stopper 74 arranged close to the front left corner of the tray.

First and fourth vertical stoppers form a shoulder preventing movement toward the front, whereas second and third vertical stoppers form a shoulder preventing movement toward the rear.

According to the first embodiment, the pressure element comprises lateral lugs 21-24 protruding in the horizontal direction, substantially located at the corners of the pressure element 2. Such lateral lugs 21-24 form cooperating elements in the pressure element 2.

Front right lug 21 is configured to abut against the front right vertical stopper 71, preventing forward movement of the pressure element.

Rear right lug 22 is configured to abut against the rear right vertical stopper 72 preventing rearward movement of the pressure element.

Rear left lug 23 is configured to abut against the rear left vertical stopper 73 preventing rearward of the pressure element.

Front left lug 24 is configured to abut against the front left vertical stopper 74 preventing forward movement of the pressure element.

Functionally, lugs 21-24 abut on vertical stoppers 71-74 to limit the movement of the pressure element along the front-rear direction.

According to a variant embodiment, the pressure element can comprise, instead of simple lugs, wheels or rollers 61-64 with their axis in the horizontal direction.

There may be provided rest stands 75,76 in each side members of the tray, for the front portion.

The rear rest stand can be arranged at the top of the rear stoppers 72,73.

The top part of the rest stands are preferably convex or cup-like to provide a stable position. At the back rest stands, there can be provided additional back stopper.

The front rest stands 75,76 are additional item arranged behind first and fourth vertical stoppers. Vertical stoppers and rest stands can be made as a strip of square or rectangular cross section (5 mm to 10 mm in both direction X and Y), that are glued or screwed to the internal wall of each side members.

L6 is the distance separating respective axis of front and rear lugs (or wheels).

L7 is the distance separating rear wall of the front vertical stopper and front wall of the rear vertical stopper.

With such guiding means, pitch movement of pressure element is allowed and promoted thanks to the front rear disbalance. Roll movement of pressure element is also allowed to a lesser extent but naturally compensated by the balanced configuration along left-right direction. Yaw movement is substantially prevented thanks to the side members encompassing the pressure element. A small gap allowing functional play is however provided. For example a gap of magnitude [1 mm-5 mm] at each side is considered.

Rest position is denoted P0 at FIG. 2. Here the rest position corresponds to a horizontal position of the pressure element, spaced away from the tray by a distance noted H2. H2 can be at least 25 mm, even 30 mm. 112 can be at least 75% of H1.

H2 can be chosen such that the bag has no contact with the pressure element even though the bag rises under inflation for the pressure of leak test.

H2 can be chosen according to another criterion, in a configuration where an operator's hand is considered to be introduced between the tray and the pressure element. In such case, a large free space is provided to accommodate the hand(s) of a user to place a new bag to be emptied. If compared to a hinged arrangement at the back side, the promoted solution provides a much higher free space at the back side of the tray where the handling recess 35 is to be placed.

According to a variant embodiment, the rest position can correspond to an inclined position, namely with the front side being higher than the back side, exhibiting an open angle to facilitate insertion of the bag.

In FIG. 2, in phantom dotted line, are shown intermediate positions in the downward course of the pressure element 2.

Instead of vertical stoppers, guiding means in the side members can be formed as grooves, arranged to receive the above mentioned lugs or wheels.

Kinematics is as follows. For initiating the emptying sequence, the user pulls the pressure element from the rest position; and the user lets the pressure element go down.

For removing the tested bag, the user lifts the pressure element and pushes it back on the rest position P0.

The invention claimed is:

1. A device for emptying a flexible bag comprising a fluid product, the device comprising:
a tray comprising a base having at least a top flat surface and two side members rigidly mounted on the base, perpendicularly to the base, the base being arranged substantially horizontally, namely along a front-rear direction and a left-right direction,
a pressure element having at least a flat bottom face, for pressing downwards on a flexible bag under the influence of gravity,
wherein the tray comprises guiding means for guiding the pressure element, as the pressure element goes downwards when the bag is emptying, and
the pressure element exhibiting a gravity center and a geometric center, and the gravity center being away from the geometric center,
wherein the pressure element is monolithic with a thickness gradient, with or without steps.

2. The device according to claim 1, wherein the pressure element is substantially rectangular with four corners, the geometric center is defined at the intersection of two diagonal lines joining respectively two pairs of opposite corners.

3. The device according to claim 1, further comprising a rest position for the pressure element, wherein the pressure element is at a predetermined distance from the base of the tray, facilitating thereby installation of a flexible bag on the tray when the pressure element is at the rest position.

4. The device according to claim 1, wherein the gravity center and the geometric center are spaced from one another by a predetermined distance which is at least 5 mm.

5. The device according to claim 1, further comprising a recessed area for accommodating tubes of a flexible bag, the recessed area in a center front portion of the pressure element.

6. The device according to claim 1, wherein the pressure element comprises lateral lugs protruding in the horizontal direction.

7. The device according to claim 6, further comprising at least two vertical stoppers in each side members of the tray, for limiting the movement of the pressure element along the front-rear direction.

8. The device according to claim 1, wherein the pressure element comprises wheels or rollers, wherein axis of the wheels or rollers being in the horizontal direction.

9. The device according to claim 1, further comprising rest stands in each side members of the tray.

10. A system comprising a device according to claim 1, and one or more flexible bags to be emptied.

11. A device for emptying a flexible bag comprising a fluid product, the device comprising:
a tray comprising a base having at least a top flat surface and two side members rigidly mounted on the base, perpendicularly to the base, the base being arranged substantially horizontally, namely along a front-rear direction and a left-right direction,
a pressure element having at least a flat bottom face, for pressing downwards on a flexible hag under the influence of gravity,
wherein the tray comprises guiding means for guiding the pressure element, as the pressure element goes downwards when the bag is emptying, and
the pressure element exhibiting a gravity center and a geometric center, and the gravity center being away from the geometric center,
wherein the pressure element comprises wheels or rollers, wherein axis of the wheels or rollers being in the horizontal direction.

12. The device according to claim 11, wherein the pressure element is monolithic with a thickness gradient, with or without steps.

13. The device according to claim 11, wherein the pressure element is substantially rectangular with four corners, the geometric center is defined at the intersection of two diagonal lines joining respectively two pairs of opposite corners.

14. The device according to claim 11, further comprising a rest position for the pressure element, wherein the pressure element is at a predetermined distance from the base of the tray, facilitating thereby installation of a flexible bag on the tray when the pressure element is at the rest position.

15. The device according to claim 11, wherein the gravity center and the geometric center are spaced from one another by a predetermined distance which is at least 5 mm.

16. The device according to claim 11, further comprising a recessed area for accommodating tubes of a flexible bag, the recessed area in a center front portion of the pressure element.

17. The device according to claim 11, wherein the pressure element comprises lateral lugs protruding in the horizontal direction.

18. The device according to claim 11, further comprising at least two vertical stoppers in each side members of the tray, for limiting the movement of the pressure element along the front-rear direction.

19. The device according to claim 11, wherein the pressure element comprises wheels or rollers, wherein axis of the wheels or rollers being in the horizontal direction.

20. The device according to claim 11, further comprising rest stands in each side members of the tray.

21. A system comprising a device according to claim 11, and one or more flexible bags to be emptied.

* * * * *